Dec. 1, 1964 W. F. BREWER 3,158,978
BLADE HOLDER FOR DISC TYPE MOWERS
Filed June 3, 1963
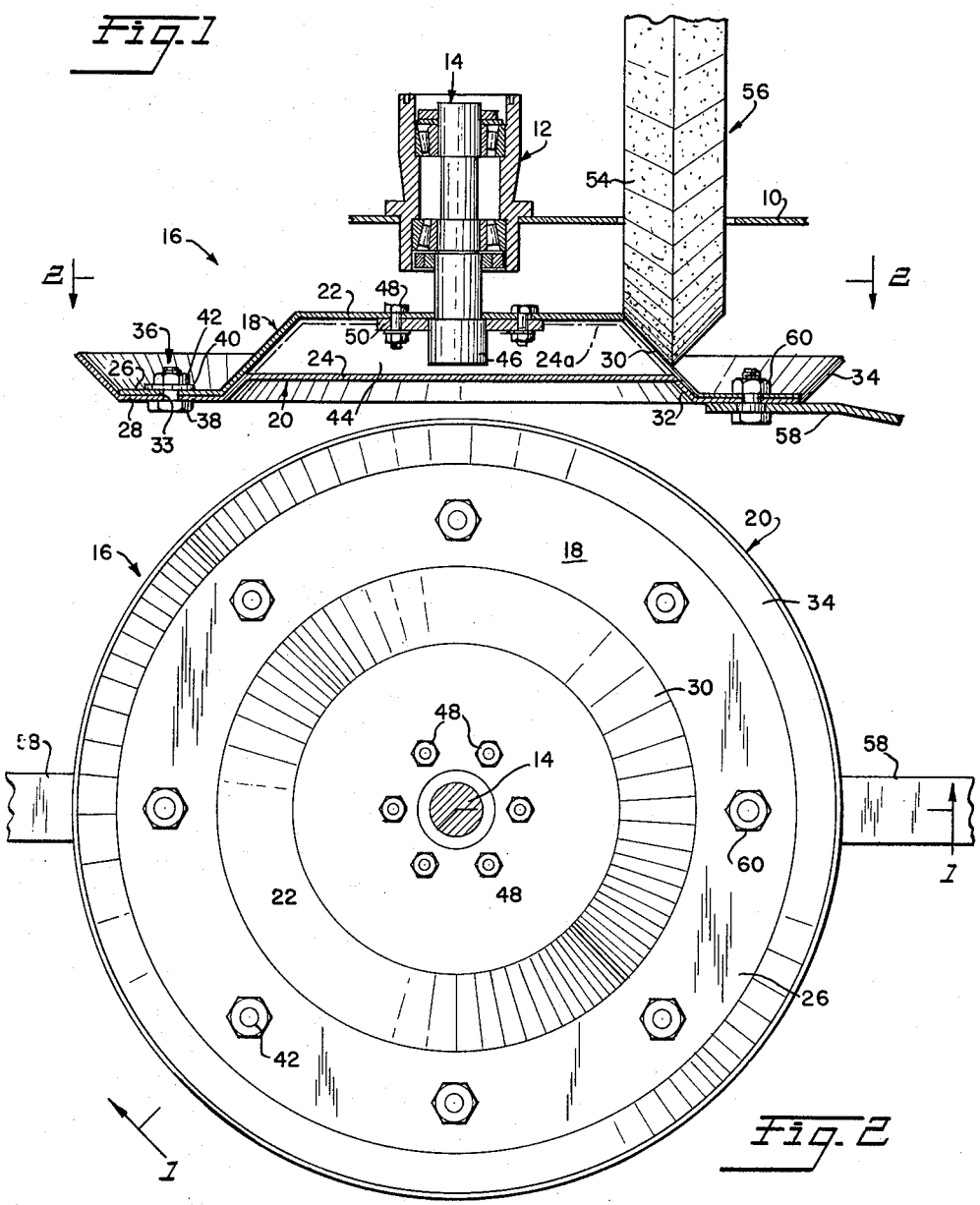
INVENTOR
WILLIE F. BREWER
BY Scrivener & Parker
ATTORNEYS 3,158,978
BLADE HOLDER FOR DISC TYPE MOWERS
Willie F. Brewer, Minden, La., assignor to Dealer Associates, Inc., Minden, La., a corporation of Louisiana
Filed June 3, 1963, Ser. No. 284,887
4 Claims. (Cl. 56—295)

This invention relates to mowers of the rotary disc variety and more particularly to an improved blade holder for such mowers.

The present invention is broadly concerned with the type of blade holder shown and described in Patent Number Reissue 24,811. The patented holder comprises a unitary dished shaped structure having an upwardly and outwardly flared skirt and a central upstanding recessed portion having an external conical sidewall adapted to be frictionally engaged by a tire or wheel for rotating the holder, when the wheel is driven from a source of power, usually the power take-off of a tractor. The holder is rotatably connected to the bed plate of the cutter frame by a stub shaft and pivotally connected to a horizontal annular flange between the skirt and the conical surface are diametrically opposed cutter blades. During cutting operations, the skirt serves as a skid to ease the holder assembly over uncuttable objects such as rocks and stumps and the central recess serves as a relieving area into which the uncuttable objects can extend thus avoiding any tendency of the holder assembly to skid sideways off of the object, as would occur with a flat lower surface, to leave islands of uncut vegetation between adjacent swaths. In addition to serving as a skid, the upturned skirt also protects the driving wheel where it engages the friction surface and protects the central spindle assembly. Though the patented holder assembly has its principal utility in the tire type drive, the holder has equal utility with a central gear drive whereby the spindle is driven directly through gearing from the power source.

The holder of the patent has proved entirely successful and is in widespread use in many parts of the world. However, as the popularity of the disc type mower has increased the desirability of cutting ever wider swaths has been recognized and at the present time cutters capable of mowing a swath approximately 90 inches in width are in use. With swaths of such extreme width it will be apparent that the blades must be extremely rugged and have considerable length and weight so that the centrifugal force produced thereby is of a high order, and unless the holder is suitably reinforced it tends to partake of a somewhat oblong shape which obviously cuts down the efficiency of the driving contact between the rotating drive wheel and the conical friction surface mentioned above. Efforts to reinforce the holder have involved the welding of heavy gauge metal strapping to the underside of the holder with the strapping having horizontal parts which extend beneath the flange in such a manner that the pivot bolts for the blades pass through the horizontal parts as well as the flange of the holder.

Though the reinforcing strapping serves to prevent distortion due to centrifugal force, it has been found that the welding heat occasionally causes warping of the holder and the welding must be performed with great care not only to minimize this warping but also to avoid unbalancing the holder by the application of excessive welding metal to one side of the holder. In addition, the reinforcing strapping interferes with the smooth passage of uncuttable objects through the space afforded by the recess in the bottom of the holder.

It is an object of the present invention to avoid the disadvantages pointed out above by providing an improved holder which is sufficiently reinforced to resist centrifugal distortion yet which requires no welding, is dynamically balanced and achieves all of the advantages of the holder of the patent while requiring only semi-skilled labor to assemble.

In accordance with the invention, the foregoing objects are achieved by constructing the holder of two mating or nesting annular parts which are assembled together by bolts or other fastening means to provide a holder having all of the advantages of the patented holder, in addition to other advantages as will become apparent as the following detailed description is read in conjunction with the accompanying drawings wherein:

FIG. 1 is a vertical cross sectional view of a blade holder constructed in accordance with the present invention and taken substantially on the line 1—1 of FIG. 2; and FIG. 2 is a top plan view of the holder of the invention taken on the line 2—2 of FIG. 1.

For an over-all detailed description of a mower with which the holder of the invention may be used, reference is made to the prior patent to Murphy et al., Re. 24,811, which is assigned to the same assignee as the present invention. The mower shown in the patent is of the type which is to be attached to a tractor and driven from the power take-off thereof and, with reference to FIG. 1, comprises in part a bed plate 10 which centrally supports in suitable bearing structure, generally indicated by the numeral 12 a vertical rotatable spindle or shaft 14 which supports beneath the bed plate a rotary blade holder 16 constructed in accordance with the present invention.

As seen in FIG. 1, the blade holder comprises a pair of unitary inverted dish shaped members 18, 20 each of which is respectively provided with closed top portions 22, 24, annular radial flanges 26, 28 and inwardly and upwardly sloping sidewalls 30, 32 integrally joining the inner edges of the respective flanges 26, 28 and the outer edges of the top portions 22, 24. The lower dish shaped member 20 is generally complementary in shape with the upper member 18 and is adapted to nest within the upper member with the respective flanges 26, 28 and sidewalls 30, 32 engaged with each other. The outer edge of the flange 28 of the lower member 20 has an upwardly and outwardly extending skirt 34 and extending through the engaged flanges 26, 28 between the skirt 34 and the sidewalls 30, 32 are a plurality of circumferentially spaced registering apertures 33 containing fastening elements 36, desirably comprising headed bolts 38 which extend upwardly through the apertures to receive lock washers 40, and nuts 42 which serve to rigidly clamp the members 18, 20 together.

If desired, the top portion 24 of the lower member 20 may be arranged so as to be in abutting engagement with the top portion 22 of the upper member 18 as indicated by the phantom line 24a. Preferably, however, the sidewall 30 of the upper member extends upwardly beyond the sidewall 32 of the lower member 20 so as to provide an enclosed space 44 between the members 18, 20 which serves to protect the lower end 46 of the shaft 14 and the fastening means therefor, which may comprise a plurality of bolts 48 extending through a flange 50, rigidly connected to the lower end of the shaft 14, and the central portion 22 as shown.

As thoroughly explained in Reissue Patent 24,811, the sloping sidewall 30 is adapted to be frictionally engaged by a conical side 54 of a drive wheel 56 which is rotatably supported on the bed plate 10 of the mower and drivingly interconnected in a conventional manner with the power take-off of the tractor. Swingably fastened to the under side of the lower flange 28 are diametrically opposed cutter blades 58 of conventional construction whose inner ends may be pivotally supported by pivot bolts 60 which desirably takes the form of the bolt disclosed in the copending application of W. L. Brewer, Jr., Serial No. 212,378 filed July 25, 1962 and assigned to the same assignee as the present application and now Patent No. 3,112,599. Reference is made to said pending application for a detailed description of the preferred pivot bolt though those skilled in the art will recognize that conventional pivot means may be utilized for supporting the blade.

From the foregoing description, it will be apparent that the blade holder of the invention may be readily assembled without requiring any special skill. To assemble the holder in its position of use the upper dish shaped member 18 is first attached to the shaft 14 by engagement of the bolts 48 through the registering holes in portion 22 and flange 50. Thereafter, the lower member 20 is merely moved into nested relationship with the upper member 18, the apertures for the fastening elements 36 are moved into registry, and the elements are applied to the apertures and tightened to rigidly connect the members 18, 20 together. Thereafter the cutting elements 58 are applied to the holder as will be obvious from the drawing.

In actual use, it has been found that a holder constructed in accordance with the invention has all of the necessary rigidity to adequately withstand large centrifugal forces produced by blades capable of cutting swaths of extreme width. Additionally, the construction of the invention provides a smooth walled recess defined by the lower surface of the central portion 24 and sidewall 32 of the lower member 28 which enables the cutter to be guided over uncuttable objects with substantially no shock to any downwardly projecting parts of the cutter mechanism. It will be apparent to those skilled in the art that the holder of the present invention is not limited to use with the friction drive means shown but is equally adaptable to the gear drive type wherein the spindle 14 is directly driven through suitable conventional gearing. It will also be apparent to those skilled in the art that the holder of the present invention is susceptible of a variety of changes and modifications without, however, departing from the scope and spirit of the appended claims.

What is claimed is:

1. A blade holder for a disc type mower comprising a pair of inverted upper and lower, complementarily shaped, nested unitary dished members each having a radial planar flange, a circular central portion disposed in a plane parallel to but spaced above said flange, and a straight inwardly and upwardly sloping sidewall integrally connecting the inner edge of each flange to the outer edge of its corresponding central portion, the confronting surfaces of said flanges and the confronting overlapping parts of said side walls being in engagement with each other, each of said flanges having a plurality of circumferentially spaced registering apertures therethrough, and fastening elements extending through the registering apertures and rigidly clamping said members together.

2. The blade holder of claim 1 wherein the central portion of the lower dished member is spaced below the central portion of the upper dished member.

3. The blade holder of claim 1 including a rotatable shaft and means for rigidly connecting said shaft to the central portion of the upper member.

4. In a cutter mechanism including a vertical rotatable shaft and a horizontal circular blade holder connected to said shaft, said holder comprising a first unitary dished member having a closed top, an outwardly sloping sidewall, and a peripheral radial flange integral with the lower edge of said sidewall, a second unitary inverted dished member complementary in shape with said first member and including a downwardly and outwardly sloping sidewall and a radial flange integral with the lower edge of said side wall, said second member being nested within said first member with the respective flanges thereof engaged, circumferentially spaced removable fastening elements integrally connecting said members together, and an upwardly and outwardly sloping skirt integral with the outer edge of the flange of said second member.

References Cited by the Examiner

UNITED STATES PATENTS

| 2,867,963 | 1/59 | Lawrence et al. | 56—295 |
| 2,872,770 | 2/59 | Murphy et al. | 56—295 X |
| 3,010,269 | 11/61 | Maguire | 56—295 |

FOREIGN PATENTS 228,429   9/58   Australia.

T. GRAHAM CRAVER, *Primary Examiner.*

ANTONIO F. GUIDA, *Examiner.*